US012627779B1

(12) United States Patent
de Echaniz

(10) Patent No.: US 12,627,779 B1
(45) Date of Patent: May 12, 2026

(54) WHITE BALANCE CALIBRATION METHOD

(71) Applicant: Envisics Ltd, Milton Keynes (GB)

(72) Inventor: Sebastian de Echaniz, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 19/328,025

(22) Filed: Sep. 12, 2025

(30) Foreign Application Priority Data

Apr. 14, 2025 (GB) ...................................... 2505558

(51) Int. Cl.
*H04N 9/31* (2006.01)

(52) U.S. Cl.
CPC ......... *H04N 9/3182* (2013.01); *H04N 9/3191* (2013.01)

(58) Field of Classification Search
CPC ......... G09G 2320/0666; G09G 3/3406; G09G 3/3413; G09G 2320/0242; G09G 2320/0285; G09G 2320/0233; G02F 1/133609
See application file for complete search history.

(56) References Cited

U.S. PATENT DOCUMENTS

2003/0117714 A1* 6/2003 Nakamura ........... H04N 9/3147
                                                          348/E9.027
2017/0032745 A1* 2/2017 Sakai ................... G09G 3/3413

FOREIGN PATENT DOCUMENTS

JP        2005316163 A    11/2005
KR      20160084203 A     7/2016
KR        101746541 B1     6/2017

OTHER PUBLICATIONS

Search Report in UK patent Application GB2505558.3, dated Oct. 15, 2025.

* cited by examiner

*Primary Examiner* — John W Miller
*Assistant Examiner* — Humam M Satti
(74) *Attorney, Agent, or Firm* — McDonnell Boehnen Hulbert & Berghoff LLP

(57) ABSTRACT

A method comprising: applying a respective value of a first plurality of values of a first control parameter to each light source of a projector system, wherein each of the first plurality of values of the first control parameter determines an output luminance of a corresponding light source; measuring a first luminance and first colour space coordinates of a light pattern displayed based on the first plurality of values; converting the first luminance and first colour space coordinates to corresponding tristimulus values; calculating therefrom a respective colour luminance value corresponding to each light source; calculating a linear relationship between the first control parameter and each colour luminance value; determining a second plurality of values of the first control parameter based on the linear relationships and a target colour luminance value for each light source; and controlling the plurality of light sources using the second plurality of values.

18 Claims, 12 Drawing Sheets

WHITE BALANCE CALIBRATION METHOD

CROSS-REFERENCE TO RELATED APPLICATIONS

This application claims the benefit of priority of United Kingdom Patent Application no. 2505558.3, filed Apr. 14, 2025, which is hereby incorporated herein by reference in its entirety.

FIELD

The present disclosure relates to a method such as a method of determining or calibrating the white balance or white point of a display device or display system. More specifically, the present disclosure relates to a white balance calibration method, and a projection system for calibrating a white balance. Some embodiments relate to a method of measuring the luminance and colour of a light pattern and estimating new control parameter values to reach a target luminance and white balance based on a linear approximation method. Some embodiments relate to a projector system for implementing the method.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A holographic projector may form a full-colour holographic reconstruction. This may be achieved by displaying three single-colour holograms, and illuminating each hologram using a corresponding single-colour light source to form three single-colour holographic reconstructions at substantially the same time. An approach known as spatially-separated colours, "SSC", involves simultaneously forming the three single-colour holographic reconstructions, whilst another approach, known as frame sequential colour, "FSC", involves rapidly forming three single-colour holographic reconstructions in succession, so as to be within the integration time of the human eye. Thus, using either approach, a human viewer perceives a full-colour (i.e. polychromatic) image.

SUMMARY

Aspects of the present disclosure are defined in the appended independent claims.

In a colour display system, the range of displayable colours may be obtained from a mixture of colours each provided by a different light source (e.g. a plurality of laser diodes). By controlling the relative intensity of each colour emitted from the respective light source, a wide range of different colours can be displayed. Since the relative intensities of the light sources affect the output colour, as the skilled person would be aware, such a display may require calibration such that the colours output by the system match the desired colours of an input or target image. One such type of calibration is known to the skilled person as a white balance calibration, in which the system is calibrated to display the desired "colour" of white when, for example, the plurality of light sources are driven at the same grey level.

A typical framework for calibrating the white balance of a display system may involve displaying a known pattern at a known mixture of grey levels. For example, the light sources of the display may all be driven at the maximum grey level (either across the whole display area or in a smaller pattern, e.g. a square at the centre of the display area) which may represent the white point of the display. A measurement device may take a measurement of the colour of the displayed white point, and a controller may adjust the output of the light sources accordingly to achieve a desired white balance.

Previous approaches to white balance calibration rely on adjusting a colour light source based on an overall measurement of the light mix. Because the overall white balance is dependent on all of the colour light sources, changing one colour contribution will result in the other colour light sources needing adjusting in order to reach a target white balance. This results in multiple iterations (e.g. a feedback loop) being required in order to arrive at a target white balance. Previous approaches are therefore slow, and are not very precise, especially at low luminance, since the luminance and colour coordinates are based on an experimental approximation instead of taking into account the physical principles of colour mixing and the light sources used.

The present disclosure provides an improved white balance calibration method in which the white balance calibration is decomposed into a problem of measuring and adjusting each colour light source individually based on an approximation of a linear luminance response of the light source to a control parameter.

According to a first aspect there is provided a method. The method comprises applying a respective value of a first plurality of values of a first control parameter to each light source of a plurality of light sources. In other words, there may be a one-to-one correspondence between the values of the first control parameter and the light sources. For example, the plurality of light sources may comprise three light sources and each of the three light sources may each have a respective value of the first control parameter applied to it. Each light source of the plurality of light sources is configured to output a different wavelength of light. In other words, each light source emits a different colour of light. For example, the light sources may comprise a red, green, and blue light source. For example, a red light source may emit light having a first wavelength of 620 to 750 nm (for example, 640 to 700 nm), a green light source may emit light having a second wavelength of 490 to 570 nm (for example, 520 to 560 nm), and a blue light source may emit light having a third wavelength of 450 to 495 nm (for example, 460 to 490 nm). For example, the first wavelength and second wavelength may be separated by at least 50 nm, at least 100 nm, at least 150 nm, or the like. For example, the second wavelength and the third wavelength may be separated by at least 30 nm, at least 45 nm, at least 60 nm, or the like. Each of the first plurality of values of the first control parameter determines an output luminance of a corresponding light source of the plurality of light sources. In other words, varying the applied value of the first control parameter varies the output luminance of the respective light source. The method comprises measuring a first luminance and first colour space coordinates of a light pattern displayed by the projector system. For example, the measurement may be performed using a colorimeter, or other calibrated imaging device. The colour space coordinates may comprise (x, y) coordinates in an appropriate colour space, e.g. the CIE 1931 colour space (otherwise referred to as chromaticity space). The luminance measurement may comprise a measurement of the overall intensity of the light displayed by the projector system. The light pattern may, for example, comprise a continuous area of light in which each of the light sources are contributing a predetermined grey level (or intensity level). For example, during a white balance calibration, the projector may be configured (e.g. through the calculation and display of a hologram on a display device) such that each pixel in the light pattern is configured to have an equal contribution from each light source. The light pattern may be displayed, for example, at the centre of a display area of the projector system. The first luminance and first colour space coordinates are converted to corresponding tristimulus values. For example, the tristimulus values may be CIE XYZ tristimulus values. The method comprises calculating, based on the corresponding tristimulus values, a respective colour luminance value corresponding to each light source of the plurality of light sources. In other words, each light source has a corresponding colour luminance value, representing the respective intensity of the light sources. The calculation comprises solving a plurality of linear equations, each linear equation of the plurality of linear equations being derived from a sum of the contributions of the plurality of light sources to a respective tristimulus value, to obtain each colour luminance value. It can be understood that each light source contributes in an additive manner to each tristimulus value. By way of example only, for a system having three light sources, an X tristimulus value can be represented as $X=X_1+X_2+X_3$, a Y tristimulus value can be represented as $Y=Y_1+Y_2+Y_3$, and a Z tristimulus value can be represented as $Z=Z_1+Z_2+Z_3$. Since the contribution to each tristimulus value from each light source contains the same colour luminance value, and the colour coordinates of each light source may be known or measured beforehand, the summed tristimulus values can be solved as a set of simultaneous equations to obtain the colour luminance values of each light source. The method comprises calculating a linear relationship between the first control parameter and each colour luminance value. That is, for each colour luminance (corresponding to a respective light source) there is calculated a linear relationship as a function of the first control parameter. As an example only, as the first control parameter increases the colour luminance value may increase linearly. The calculation of the linear relationship may comprise a calculation of the gradient and the offset of the linear relationship. The calculation of each linear relationship is based on the respective colour luminance value, a previous colour luminance value from a previous iteration or an initial colour luminance value, the respective first value of the first control parameter, and a previous value of the first control parameter or an initial value of the first control parameter. In other words, a linear line is calculated to fit the measured (e.g. first) data point of the first value of the control parameter and respective colour luminance value (i.e. the applied first control parameter value and the respective measured/calculated colour luminance value), and a previous data point or an initial data point. The previous data point may be measured in a similar manner to the first data point during a previous iteration of the method, or may be an initial data point set to predetermined values (e.g. zero). The method comprises determining a second plurality of values of the first control parameter based on the linear relationships and a target colour luminance value for each light source. The target colour luminance value for each light source may be derived from an overall target luminance value and target colour space coordinates (otherwise known as a target white balance), which may be derived in the same way as the respective colour luminances are derived from the measured luminance and measured colour space coordinates. The second plurality of values may be understood as an updated set of values of the first control parameter, with the aim of getting as close to the target colour luminance values as possible. The second plurality of values may be obtained by calculating an intersecting point on the calculated linear relationship for the target colour luminance values. The method comprises controlling the plurality of light sources using the second plurality of values of the first control parameter. In other words, the second plurality of values are applied to the light sources. It can be said that the steps of applying the first plurality of values, measuring the first luminance and first colour space coordinates, converting to tristimulus values, calculating the colour luminance values, calculating the linear relationships, determining the second plurality of values, and controlling the light sources using the second plurality of values comprises one iteration of a white balance calibration algorithm which can be repeated a plurality of times.

By solving the three linear equations, it is possible to calculate measured and target luminance for each colour component and adjust the light source accordingly in one iteration. In summary, the white balance calibration is decomposed into a problem of measuring and adjusting each colour light source individually based on an approximation of a linear luminance response of the light source to a control parameter. By calibrating light sources individually, the convergence time to the target white balance is decreased, thereby reducing production calibration time. There is also no need to adjust feedback parameters as may be required in previous approaches, since the claimed method instead makes use of a linear approximation based on a previous iteration or initial values. The claimed method also provides a more precise white balance calibration, resulting in accurate colour representation which may be beneficial, for example, in a head up display application in which misinterpretation of colours may lead to confusion for users when following prompts and warnings. The claimed method is well suited to use in holographic projector systems (e.g. holographic head up displays) which tend to use discrete colour light sources (e.g. red, green, and blue laser diodes) which are modulated with a display device (e.g. a liquid crystal on silicon spatial light modulator), rather than a single colour backlight combination with a colour filter as in traditional flat panel displays, since the contribution of each colour light source can be individually controlled and calibrated for accurate colour reproduction.

The plurality of light sources comprises a first light source configured to output a first wavelength of light having colour space coordinates $x^R$, $y^R$, $z^R=(1-x^R-y^R)$, a second light source configured to output a second wavelength of light having colour space coordinates $x^G$, $y^G$, $z^G=(1-x^G-y^G)$, and a third light source configured to output a third wavelength of light having colour space coordinates $x^B$, $y^B$, $Z^B=(1-x^B-y^B)$. For example, the colour space coordinates of the light sources may be predetermined or measured beforehand. For example, the first, second and third light sources may be laser diodes configured to output a specific colour of light. The word "colour" is used herein to reflect a light wavelength, such as a wavelength in the visible part of the spectrum. In accordance with this disclosure, the wavelength of each single "colour" may be defined as the peak of a corresponding narrowband wavelength range around the peak, e.g. the narrowband wavelength range having a full wave half maximum of 15 nm, 10 nm, 5 nm, etc.

The conversion of the first luminance and first colour space coordinates into respective tristimulus values X, Y, and Z may comprise the following calculations:

$$X = Lv\frac{x}{y},$$
$$Y = Lv,$$
$$Z = Lv\frac{(1-x-y)}{y}.$$

wherein Lv is the first luminance and (x, y) are the first colour space coordinates.

The calculation of the respective colour luminance values may comprise solving the three following linear equations:

$$X = Lv^R\frac{x^R}{y^R} + Lv^G\frac{x^G}{y^G} + Lv^B\frac{x^B}{y^B},$$
$$Y = Lv^R + Lv^G + Lv^B,$$
$$Z = Lv^R\frac{z^R}{y^R} + Lv^G\frac{z^G}{y^G} + Lv^B\frac{z^B}{y^B},$$

wherein $x^\gamma$, $y^\gamma$, $z^\gamma=(1-x^\gamma-y^\gamma)$, are the colour space coordinates for the first wavelength, second wavelength, and third wavelength, such that $\gamma=\{R, G, B\}$, in order to obtain a first colour luminance value $Lv^R$ corresponding to the first light source, a second colour luminance value $Lv^G$ corresponding to the second light source, and a third colour luminance value $Lv^B$ corresponding to the second light source.

6

The linear relationship between the first control parameter and the respective colour luminance value may be determined based on the calculation:

$$m^\gamma = \frac{P_i^\gamma - P_{i-1}^\gamma}{Lv_i^\gamma - Lv_{i-1}^\gamma}$$
$$b^\gamma = P_i^\gamma - m^\gamma Lv_i^\gamma,$$

wherein $$P_i^\gamma$$

is the respective value of the first control parameter of the first plurality of values corresponding to each respective light source, $$P_{i-1}^\gamma$$

is the previous value of the first control parameter from the previous iteration or the initial value of the first control parameter corresponding to each respective light source, $$Lv_i^\gamma$$

is the colour luminance value for each respective light source, $$Lv_{i-1}^\gamma$$

is the colour luminance value from the previous iteration or the initial colour luminance value, $m^\gamma$ is the gradient of the respective linear relationship, and $b^\gamma$ is the offset of the respective linear relationship. It can be understood that i represents the iteration number of the white balance calibration algorithm.

Each of the second plurality of values of the first control parameter, $$P_{i+1}^\gamma,$$

may be determined based on the calculation of:

$$P_{i+1}^\gamma = m^\gamma Lv_t^\gamma + b^\gamma,$$

wherein $$Lv_t^\gamma$$

is the target colour luminance value for each light source.

The method steps of the first aspect may be repeated for one or more further iterations while a difference between the first luminance and a target luminance is below a first threshold and a difference between the first colour space coordinates and target colour space coordinates is below a second threshold. In other words, while an error from the target values is above the respective thresholds, the method may be iterated until the error is below the desired level and an accurate white balance is achieved. The first threshold may be a 5%, 4%, 3%, 2%, 1%, etc. deviation from the target luminance, for example. The second threshold may be a 0.01, 0.009, 0.008, 0.007, 0.006, 0.005, etc. difference between the first colour space coordinates and target colour space coordinates (e.g. when using the CIE 1931 colour coordinates system).

The further iterations may be repeated at a first temperature of the projector system. In other words, the temperature is held constant for the multiple iterations.

The first temperature and the second plurality of values of the first control parameter may be saved in a lookup table implemented on a computing device in communication with the projector system when the difference between the first luminance and a target luminance is below a first threshold and a difference between the first colour space coordinates and target colour space coordinates is below a second threshold. In other words, once the error from the target values is smaller than the respective threshold, the second plurality of values is saved for the constant first temperature. In this way, a lookup table (LUT) may be populated for a plurality of temperatures and a respective second plurality of values of the first control parameter. In some examples, a temperature sensor of the projector system may measure an ambient temperature of the projector system and select a corresponding set of second values from the LUT and apply them to the light sources based on a corresponding stored temperature closest to the measured ambient temperature.

The first control parameter may comprise one of the group comprising: a pulse width modulation parameter for each of the plurality of light sources, a digital-analogue converter parameter for each of the plurality of light sources, a photodiode signal parameter for each of the plurality of light sources, and a scaling factor applied to a uniformity map for controlling the amount of light projected by each of the light sources. For example, the digital-analogue converter (DAC) parameter may control a laser diode current; the photodiode signal parameter may be a signal which a closed loop control system aims to maintain by controlling the DAC; the pulse width modulation (PWM) parameter may control a duty cycle of a PWM signal for controlling a laser diode; and the scaling factor may be an overall scaling factor applied to a uniformity map to increase or decrease the amount of light in an image.

The selection from the group may be determined based on the measured value of the first luminance or an overall target luminance. In other words, the white balance calibration may be performed with a different parameter type depending upon the overall (target or measured) luminance of the display, since different parameters may be more optimally suited to different levels of luminance.

A first one of the group may be selected for a first range of measured first luminance values (or target overall luminance values), and a second one of the group is selected for a second range of measured first luminance values (or target overall luminance values).

The method may further comprise applying a first plurality of values of a second control parameter, each corresponding to a respective one of the plurality of light sources, wherein the second control parameter is a different one of the group than the first control parameter, wherein the second control parameter is used to control an overall luminance of the projector system (i.e. as opposed to the first control parameter which is used to set the white balance of the projector system).

According to a second aspect there is provided a projector system. The projector system comprises a plurality of light sources, each configured to output a different wavelength of light. The projector system comprises a display device configured to display a hologram, such that a light pattern is displayed at an image plane when the display device is illuminated by the plurality of light sources. For example, the display device may be a spatial light modulator (e.g. a liquid crystal on silicon, LCOS, SLM). The projector system comprises a measurement device configured to measure a first luminance and first colour space coordinates of the light pattern displayed at the image plane. For example, the measurement device may be a colorimeter or other calibrated imaging device. The projector system further comprises a computing device in communication with the plurality of light sources and the measurement device. The computing device is configured to apply a respective value of a first plurality of values of a first control parameter to each of the plurality of light sources, wherein each value of the first plurality of values of the first control parameter determines an output luminance of a corresponding light source of the plurality of light sources. The computing device is configured to receive the first luminance and first colour space coordinates from the measurement device. The computing device is configured to convert the first luminance and first colour space coordinates to corresponding tristimulus values. The computing device is configured to calculate, based on the corresponding tristimulus values, a respective colour luminance value corresponding to each light source of the plurality of light sources, wherein the calculation comprises solving a plurality of linear equations, each linear equation of the plurality of linear equations being derived from a sum of the contributions of the plurality of light sources to a respective tristimulus value, to obtain each colour luminance value. The computing device is configured to calculate a linear relationship between the first control parameter and each colour luminance value based on: the respective colour luminance value, a previous colour luminance value from a previous iteration or an initial colour luminance value, the respective first value of the first control parameter, and a previous value of the first control parameter from a previous iteration or an initial value of the first control parameter. The computing device is configured to determine a second plurality of values of the first control parameter based on the linear relationships and a target luminance value for each light source. The computing device is configured to apply the second plurality of values of the first control parameter to the plurality of light sources.

The computing device of the projector system of the second aspect may be further configured to carry out the method steps described above in relation to the first aspect.

According to a third aspect, there is provided a (transitory or non-transitory) computer readable medium comprising instructions which, when executed by one or more processors, causes the one or more processors to perform the method of the first aspect.

The term "colour component" of a colour image refers to the amounts—typically intensity values—of a respective colour used to represent the colours of the image within an image area. For example, in RGB image data, there are three colour components of a colour image, namely a red component, a green component and a blue component. Each colour component of a colour image typically comprises an array of values for the respective colour, wherein each value represents the amount—typically intensity—of the respective colour of light used to represent the particular colour at a respective spatial position within the image area. Thus, for example, each position within the array of values for the colour components may correspond to the position of an image pixel within the image.

The term "colour space" or "chromaticity space" is well known to the person skilled in the art of colour science or display technology, and may be regarded as a system for representing the chromaticity of colours. In particular, a chromaticity space enables the representation of (the quality of) colours independent of luminance. Typically, the chromaticity of a colour in a chromaticity space consists of two independent parameters, namely hue (h) and saturation (s). Thus, a chromaticity space is a 2D colour space, and the standard chromaticity space is the so-called CIE 1931 xy chromaticity space. Thus, the chromaticity of a particular colour is the chromaticity value in a chromaticity space that represents the colour (e.g., in terms of hue (h) and saturation (s)), independent of (or with normalized) intensity/luminance.

Reference herein to "chromaticity" refers to an objective measure of colour in chromaticity space. Chromaticity may comprise a point or set of coordinates in chromaticity space. The coordinates may be polar coordinates such as hue and saturation. The coordinates may also be linear coordinates in xy-chromaticity space. In accordance with this disclosure, colour images defined in RGB colour space are processed. In some embodiments, the colour images are converted between a colour space and chromaticity space. The person skilled in the art will be familiar with the various approaches to converting chromaticity into RGB colour space, and vice versa. Whilst some embodiments describe two single colour components, e.g. green and blue, the reader will appreciate that these embodiments extend to three single colour components, namely, RGB. Likewise, whilst full colour image formation generally requires all three colour components in RGB colour space, statements herein refer to only two single colour components because the third single colour component is not essential in order to embody the concepts that are disclosed herein.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
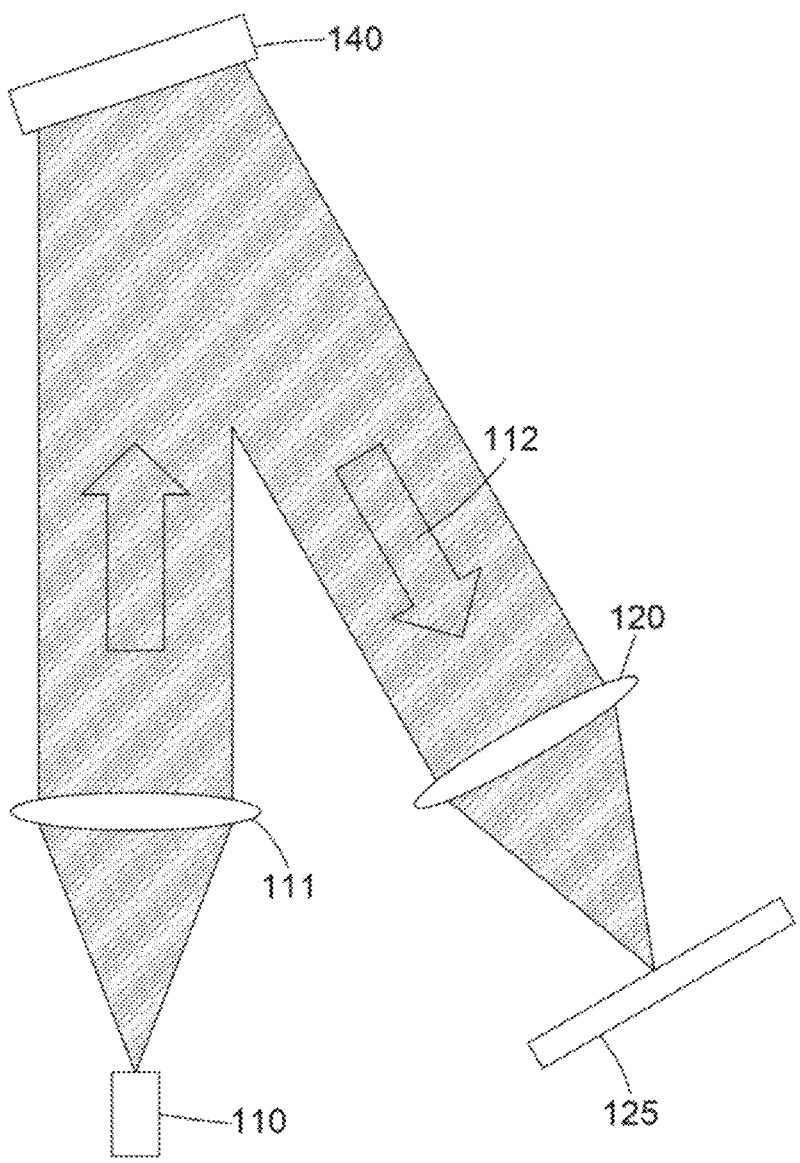
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved"

from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
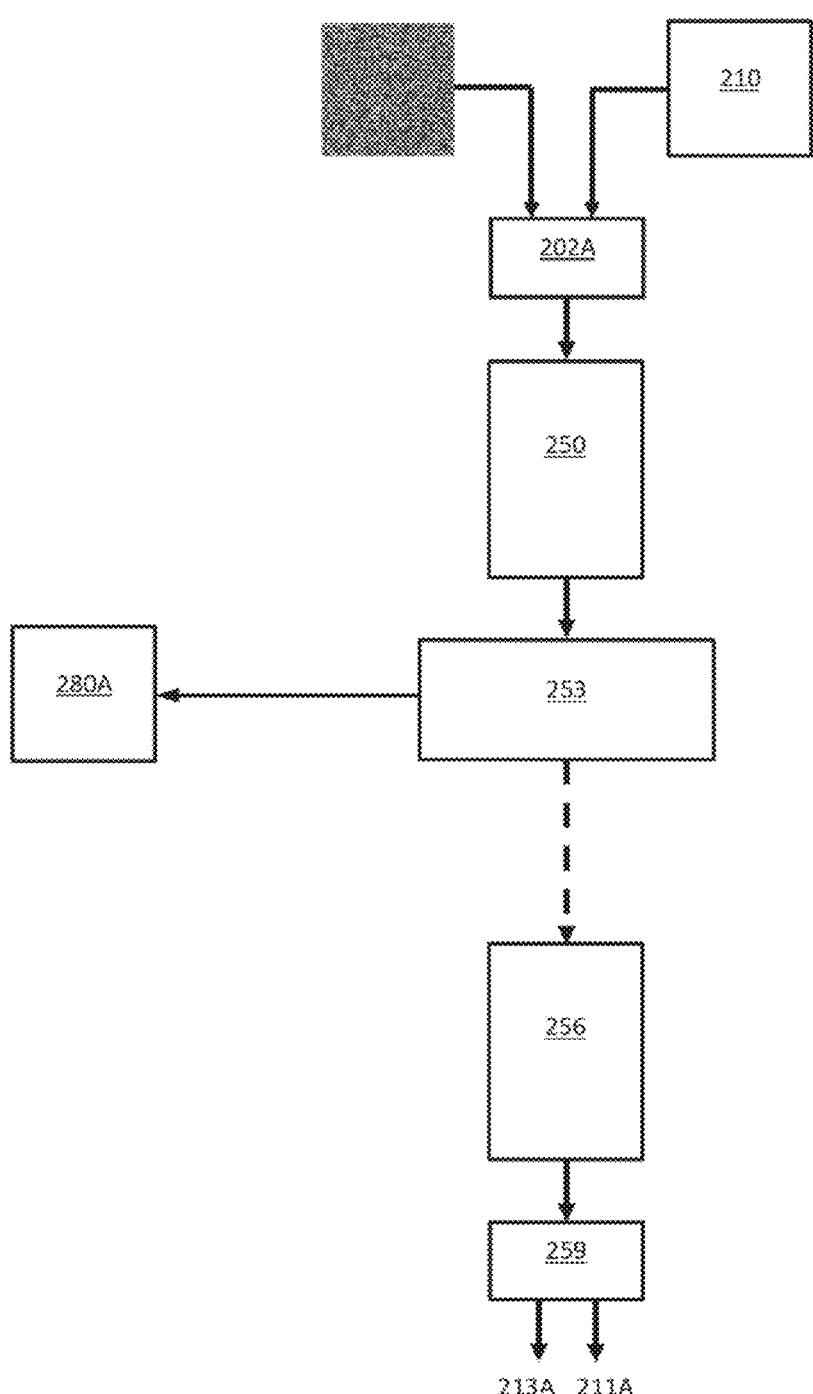
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
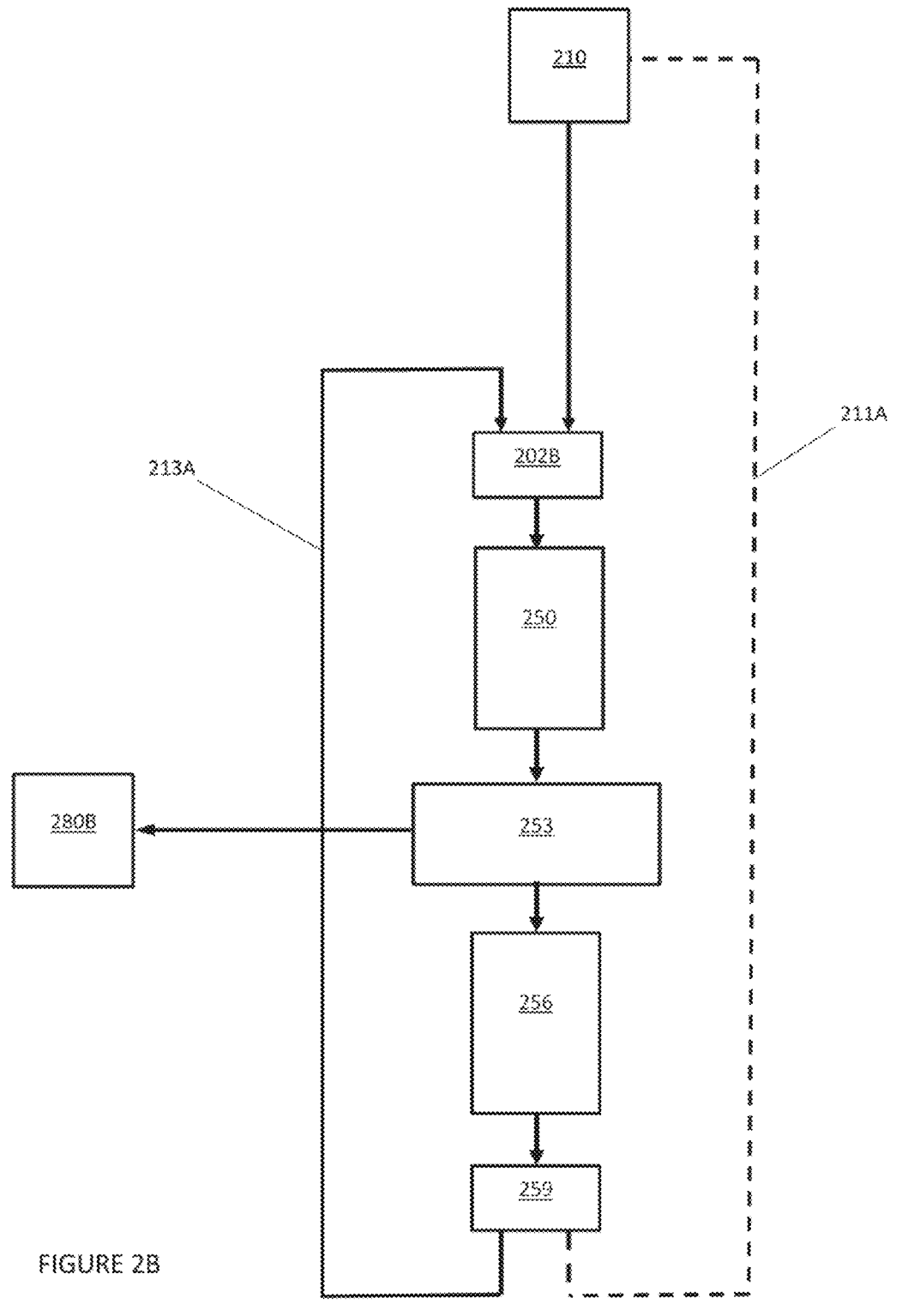
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
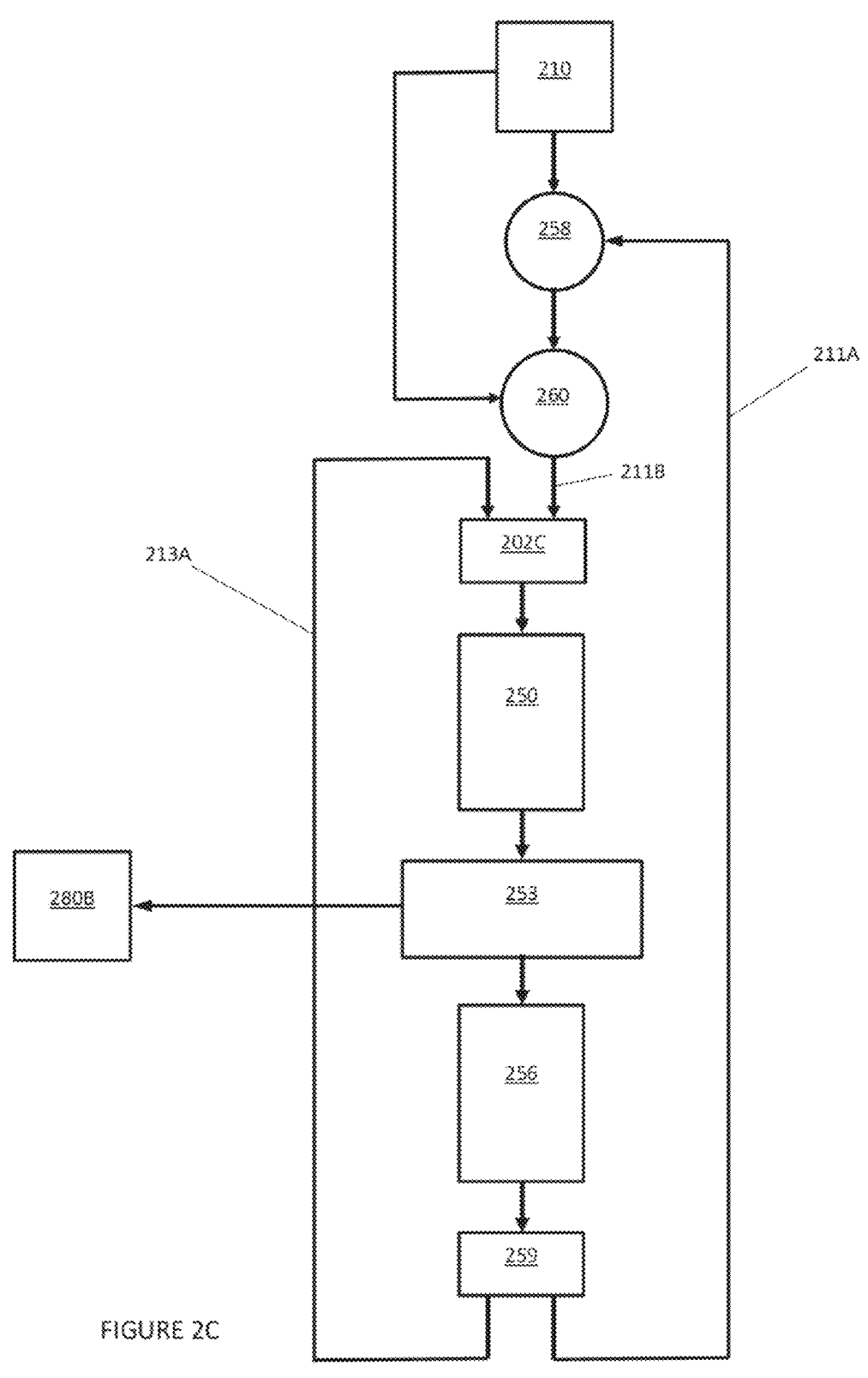
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{exp(i\psi_n[u, v])\}$$

$$\psi_n[u, v] = \angle F\{\eta \cdot exp(i\angle R_n[x, y])\}$$

$$\eta = T[x, y] - \alpha(|R_n[x, y]| - T[x, y])$$

where:

F' is the inverse Fourier transform;

F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
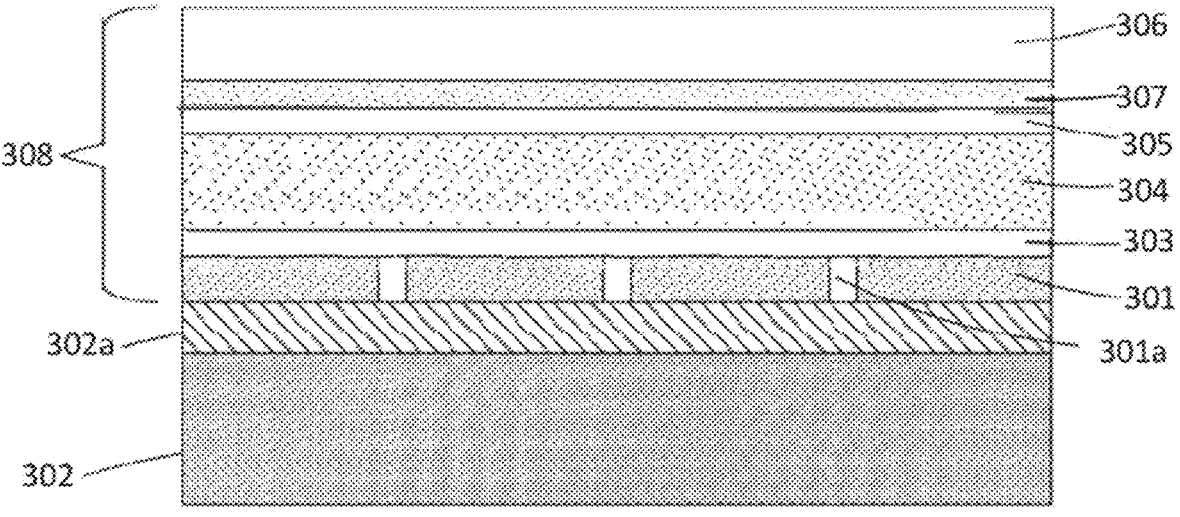
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Colour Holographic Projector

Figure 4:
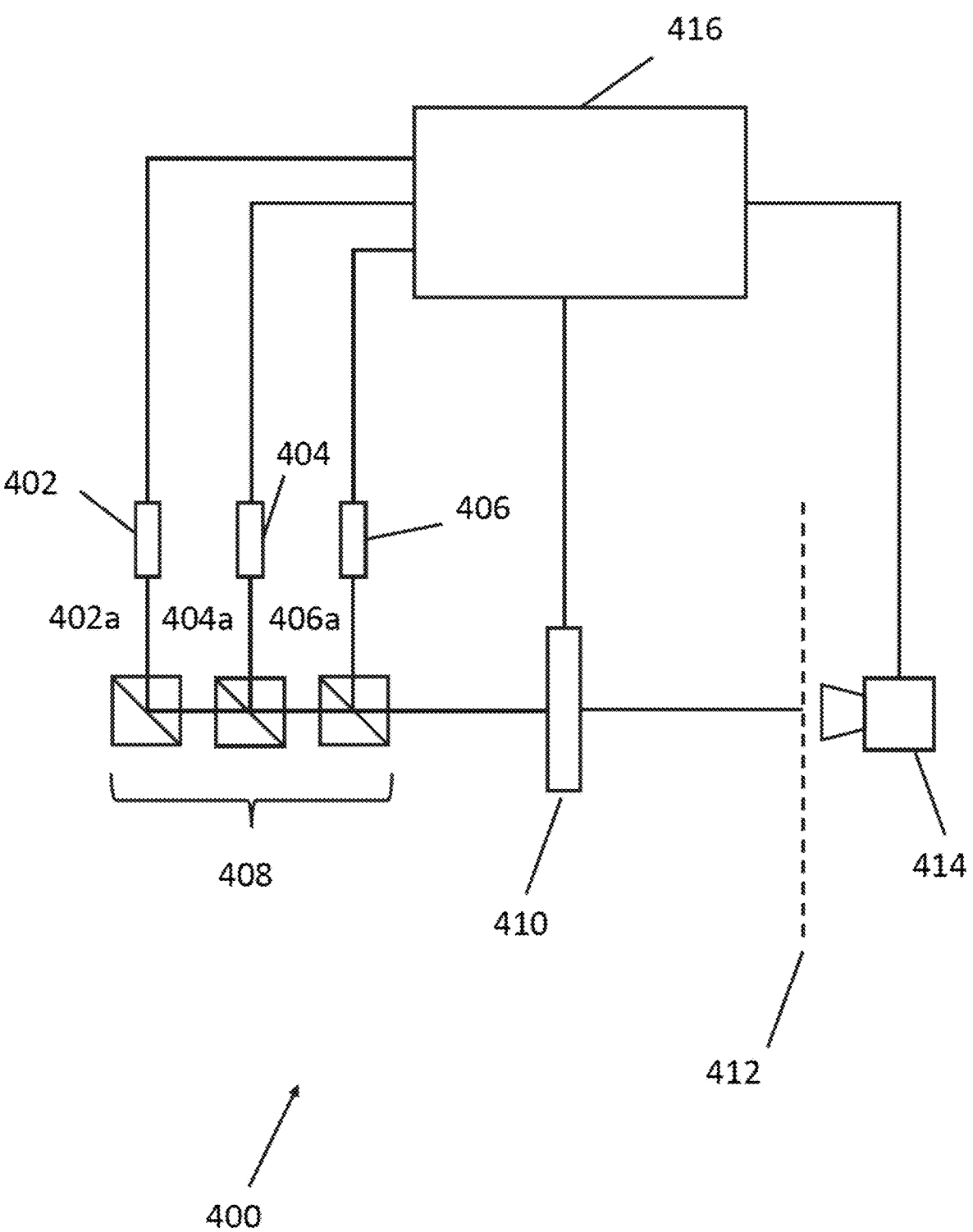
FIG. 4 shows a projection system arranged for calibrating the white balance of the projected image.

FIG. 4 shows an example colour holographic projection system 400. In particular, FIG. 4 shows a plurality of light sources 402, 404, 406, which are each configured to output light having a different wavelength. In the illustration of FIG. 4, light source 402 outputs light 402a having a first wavelength, light source 404 outputs light 404a having a second wavelength, and light source 406 outputs light 406a having a third wavelength. In some examples, the plurality of light sources are laser diodes configured to output coherent red, green and blue light. Each light source may also have an associated collimating lens (not shown) for ensuring that the light output by each light source is not diverging.

The light output from the plurality of light sources may be redirected or combined, for example by use of mirrors and/or beamsplitters 408. The light output by each of the light sources 402, 404, 406 is incident upon a display device 410.

Display device 410 may, for example, be an LCOS SLM configured to display a hologram as an array of phase delay pixel values, such that a holographic image (or light pattern) may be formed at an image plane 412. For the sake of clarity, a number of additional optical components have been omitted from the illustration of FIG. 4 which may also be used to form the holographic image.

A measurement device 414 is positioned to measure properties of the image formed at the image plane 412. In particular, the measurement device 414 is configured to measure the luminance of a light pattern displayed on the image plane 412, as well as the colour of the light pattern. The measurement of the colour of the light pattern may be output as colour space coordinates, e.g. (x, y) coordinates in the CIE 1931 colour space. In some embodiments, measurement device 414 outputs the colour space coordinates to computing device 416, while in other embodiments the measurement device 414 outputs raw colour data to the computing device 416 which is converted into colour space coordinates by computing device 416.

Computing device 416 is in communication with the plurality of light sources 402, 404, 416, display device 410, and measurement device 414. Computing device 416 may comprise a processor and memory (not shown). The memory of the computing device 416 may store a computer program for carrying out a white balance calibration method in accordance with the present disclosure when executed by the processor. Computing device 416 may be configured to control the plurality of light sources 402, 404, 406 and the display device 410, and may be configured to receive data from measurement device 414. In particular, computing device may be configured to apply a plurality of values of a control parameter to the plurality of light sources 402, 404, 406. For example, computing device 416 may apply a first value of a first control parameter to first light source 402, a second value of the first control parameter to second light source 404, and a third value of the first control parameter to third light source 406. The first control parameter may allow control over the luminance of colour light output by each light source as part of the white balance calibration algorithm according to the present disclosure.

The computing device 416 may control display device 410 to display a hologram such that when the display device is illuminated by coherent light from the plurality of light sources 402, 404, 406, a light pattern is projected at image plane 412, wherein the light pattern is a predetermined shape and brightness for the purposes of white balance calibration. In some embodiments, the computing device 416 controls the display device 410 directly, and in some embodiments the computing device 416 sends a signal to a display device controller (not shown) to configure the display device 410 to display the desired hologram.

White Balance Calibration Method

Figure 5:
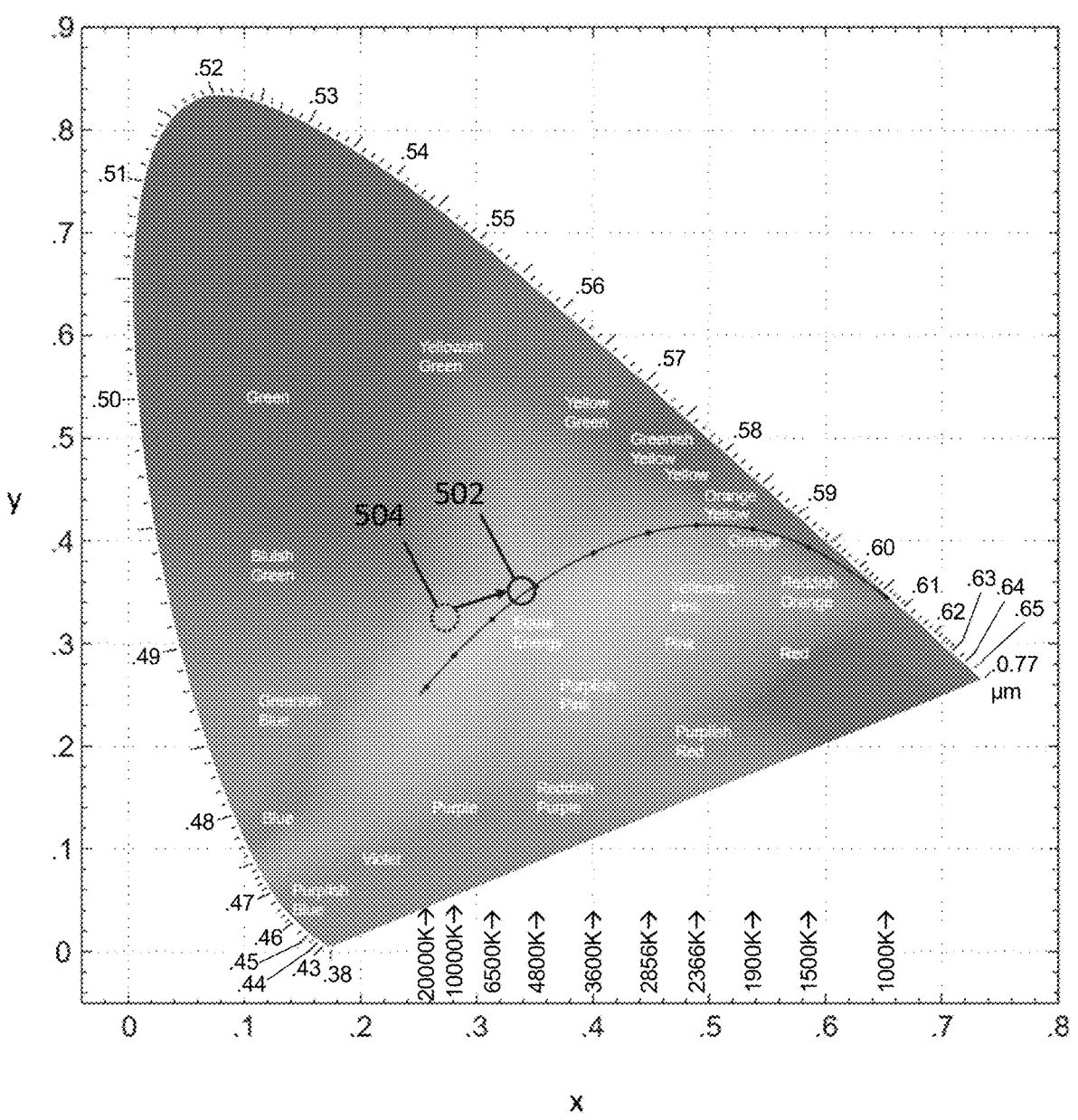
FIG. 5 shows colour space diagram with measured and target colour coordinates.

FIG. 5 shows a colour space diagram. The solid line on the colour space diagram shows the Planckian locus which represents the locus of colours that a black body would output as a function of the blackbody temperature. This locus is typically used as a description of "colour temperature" in Kelvin and may form a useful reference point when setting a target white point.

A target white point 502 may be defined by a user or manufacturer as part of an initialisation of the white balance calibration method according to the present disclosure. Target white point 502 may have coordinates $(x_t, y_t)$, and may also have an associated target luminance value $Lv_t$ set by the user or manufacturer.

Before calibration, a projector system may have a white point 504 which has colour space coordinates $(x_0, y_0)$ which differ from the target colour space coordinates and may have a luminance $Lv_0$ which likewise may differ from the target luminance value.

As indicated by the arrow in FIG. 5, the white balance calibration algorithm according to the present disclosure aims to adjust the relative luminance output by each light source in order to achieve the target white point colour coordinates and target luminance.

FIGS. 6A, 6B, 6C, and 6D show a flowchart illustrating the steps for calibrating the white balance of a projector system in accordance with embodiments of the disclosure.

Figure 6A:
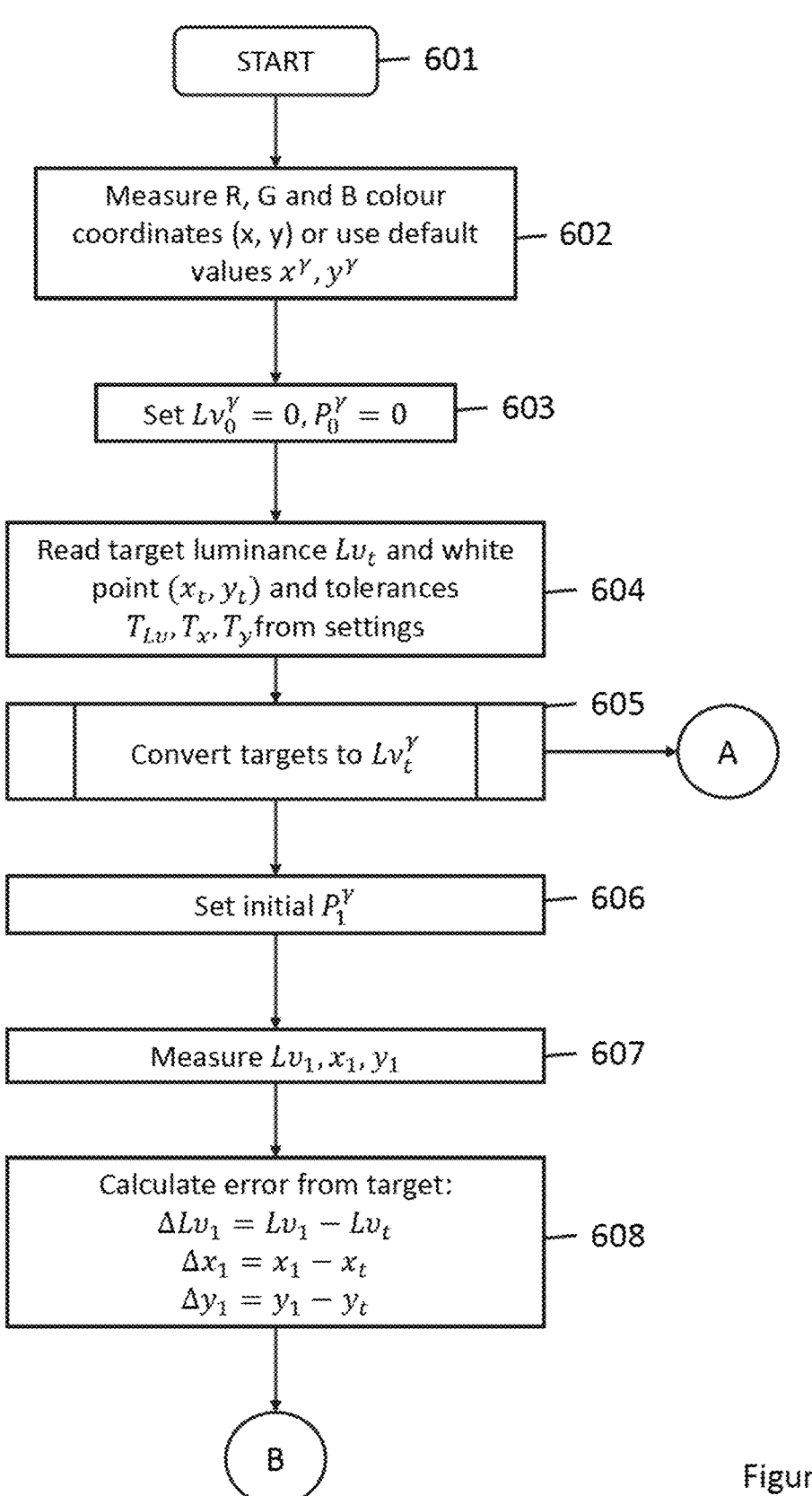
FIGS. 6A, 6B, 6C, and 6D show a flowchart for carrying out a white balance calibration method.

FIG. 6A begins with step 601 which initialises the white balance calibration process.

In step 602, the colour coordinates for each light source are measured, or alternatively default colour coordinates may be used for each light source. In the embodiment of FIG. 6A, the light sources comprise a red (R), green (G) and blue (B) light source, each having colour coordinates $(x^\gamma, y^\gamma)$ where $\gamma=\{R, G, B\}$. Having prior knowledge of the colour coordinates for each light source allows for faster and more precise white balance calibration since the inputs of the colour mix is known in advance.

Step 603 comprises another initialisation step before the first iteration begins, whereby colour luminance values $$Lv_0^\gamma$$

and control parameter values $$P_0^\gamma$$

are set to zero for i=0.

In step 604, the target luminance $Lv_t$, target white point $(x_t, y_t)$ and tolerances $T_{Lv}$, $T_x$, $T_y$ are read from memory (e.g. memory of computing device 416 of FIG. 4). These values may be reconfigured by an operator of the projector system via a user interface connected to the computing device 416. For example, the user interface may comprise a graphical user interface (GUI) which the operator can manipulate in order to select the desired white point and luminance, e.g. by way of sliders (e.g. along the Planckian locus) or 2D colour map.

In step 605, the target luminance $Lv_t$ and target white point $(x_t, y_t)$ are converted into target colour luminance values. The process for this conversion is set out in FIG. 6B which is connected to the flowchart of FIG. 6A by connector A.

Figure 6B:
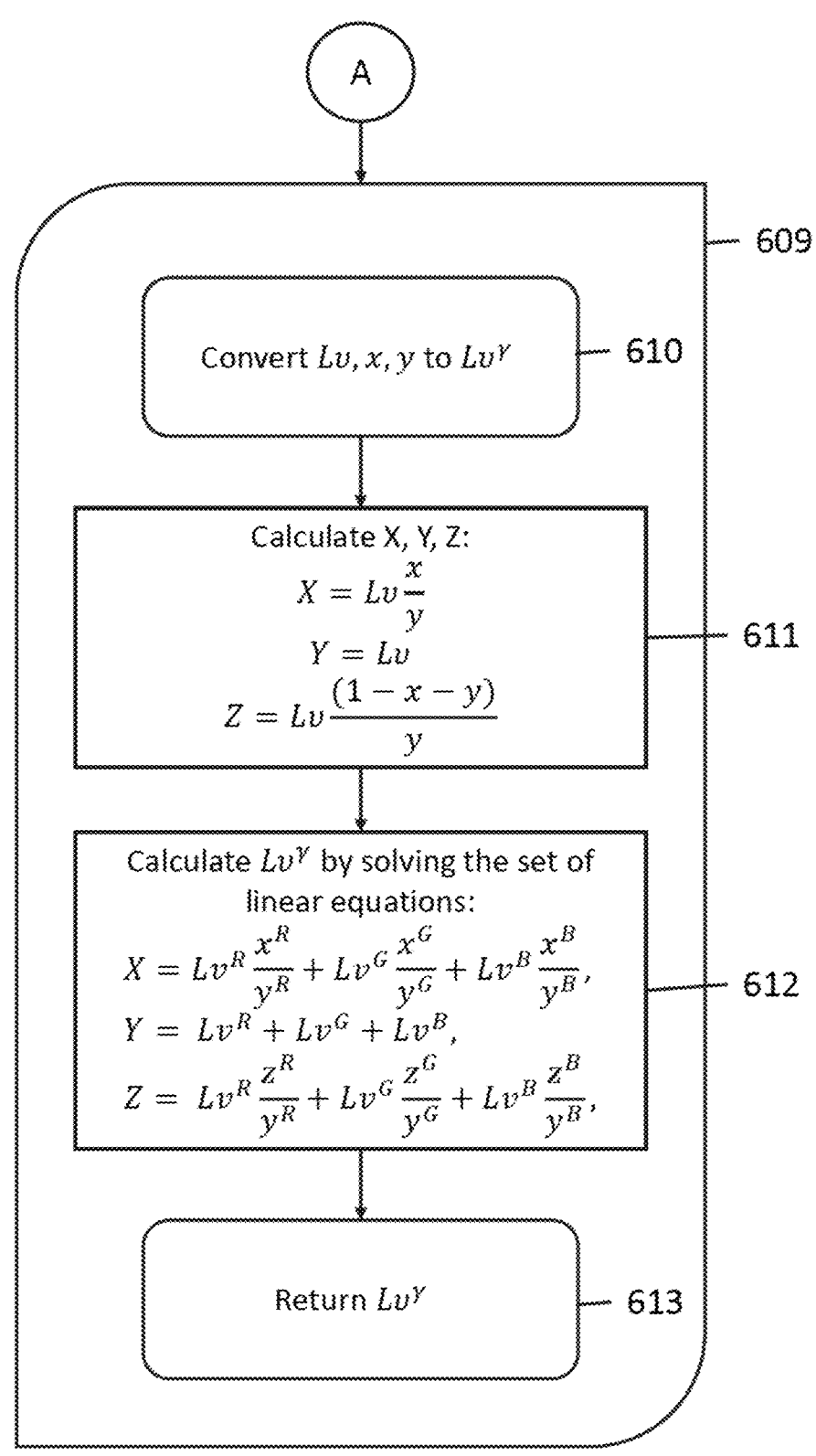
Figure 6C:
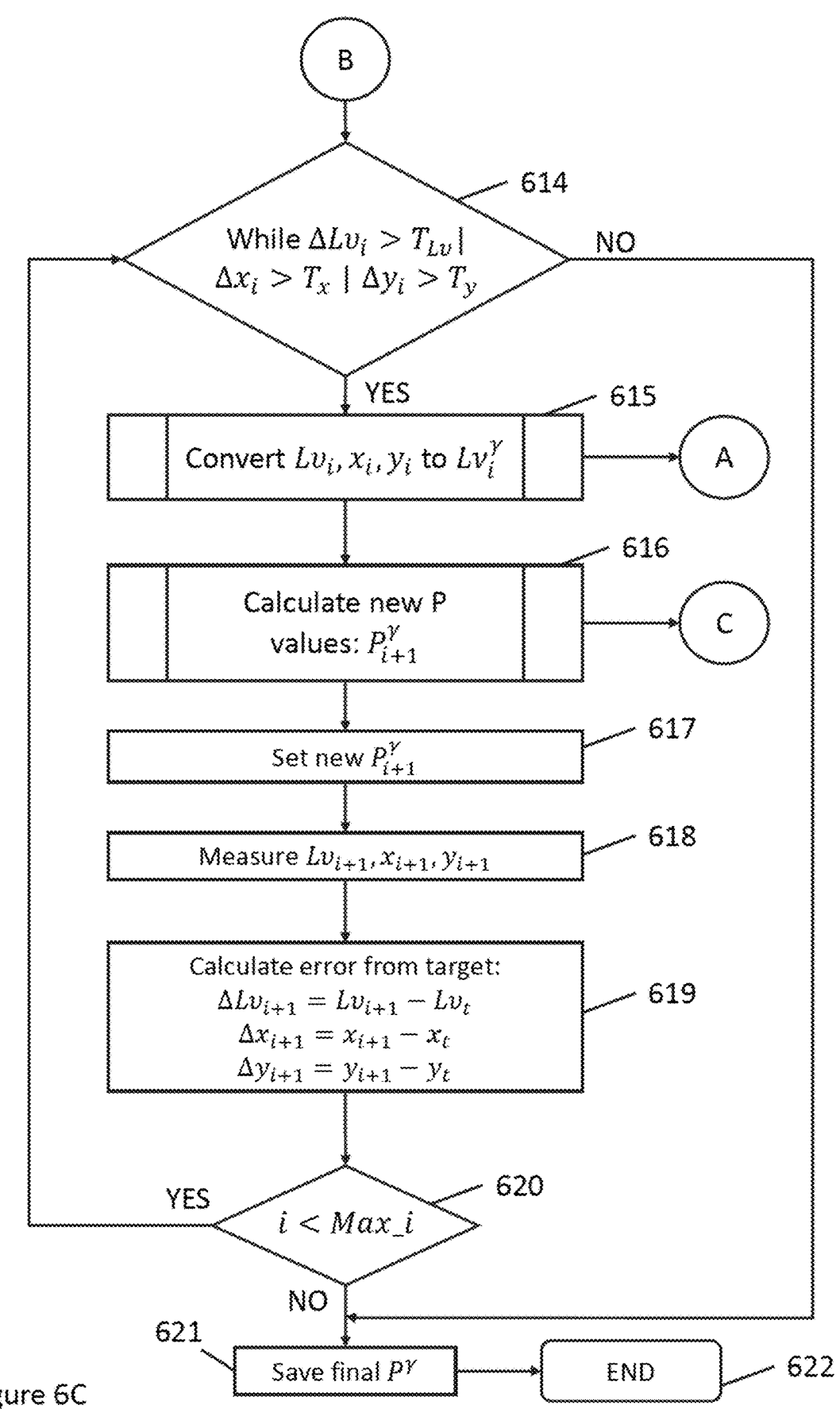

FIG. 6B shows a conversion process 609 which takes as an input a luminance and colour space coordinates at step 610 and provides as an output a series of colour luminance values at step 613.

For converting the target luminance $Lv_t$ and target white point $(x_t, y_t)$ as part of step 605, corresponding tristimulus values X, Y, Z are calculated in step 611.

Once the tristimulus values are calculated, in step 612 the target colour luminance values are calculated by solving the following set of linear equations (where $z^\gamma=(1-x^\gamma-y^\gamma)$):

$$X = Lv^R \frac{x^R}{y^R} + Lv^G \frac{x^G}{y^G} + Lv^B \frac{x^B}{y^B},$$

$$Y = Lv^R + Lv^G + Lv^B,$$

$$Z = Lv^R \frac{z^R}{y^R} + Lv^G \frac{z^G}{y^G} + Lv^B \frac{z^B}{y^B},$$

These equations were formulated by the inventor by recognising that, for a plurality of mixing light sources, the tristimulus values can be represented calculated in an additive manner such that for three light sources an X tristimulus value can be represented as $X=X_1+X_2+X_3$, a Y tristimulus value can be represented as $Y=Y_1+Y_2+Y_3$, and a Z tristimulus value can be represented as $Z=Z_1+Z_2+Z_3$.

In these equations, the values of X, Y, Z, $x^\gamma$, $y^\gamma$, and $z^\gamma$ are known, leaving $Lv^R$, $Lv^G$, and $Lv^B$ as three unknowns to be calculated. Since there are three linear equations and three unknowns, $Lv^R$, $Lv^G$, and $Lv^B$ can be calculated by solving the three tristimulus equations as simultaneous equations using known mathematical techniques that the skilled person would be familiar with.

The target colour luminance values $Lv^\gamma$ are returned as an output at step 613.

Returning to FIG. 6A, at step 606 an initial value of the control parameter $$P_1^\gamma$$

is set for each colour light source. Each initial control parameter value may be non-zero.

$$P_1^\gamma$$

may be understood as a first "best guess" attempt at reaching the desired target white balance, such that in some embodiments default values for $$P_1^\gamma$$

may be used which may be known to be close to the desired white point. Alternatively, $$P_1^\gamma$$

may be assigned on a random basis if a suitable starting point is not known in advance.

In step 607, a first measurement is made of the luminance $Lv_1$ and colour coordinates $x_1$, $y_1$. The measurement may be performed by measurement device 414 of FIG. 4, for example.

In step 608, the error (or difference) from the target luminance and target colour coordinates is calculated for the first luminance and first colour coordinates. The process then continues via connector B to the flowchart shown in FIG. 6C.

In step 614, an evaluation is made of whether the error values calculated in step 608 are below the defined thresholds. If the error values are still greater than the respective thresholds (YES), then the process moves on to step 615. If the error values are less than the respective thresholds (NO), then the process moves on to step 621.

In step 615, the present iteration's measured luminance value and colour coordinates are converted to colour luminance values $$Lv_i^\gamma$$

as described above in relation to process 609 which is not repeated here.

Once the colour luminance values $$Lv_i^\gamma$$

have been calculated by process 609, in step 616 new control parameter values are calculated for the next iteration (i+1).

Calculation of the new control parameter values is performed by linear approximation process 623 via connection point C.

Figure 6D:
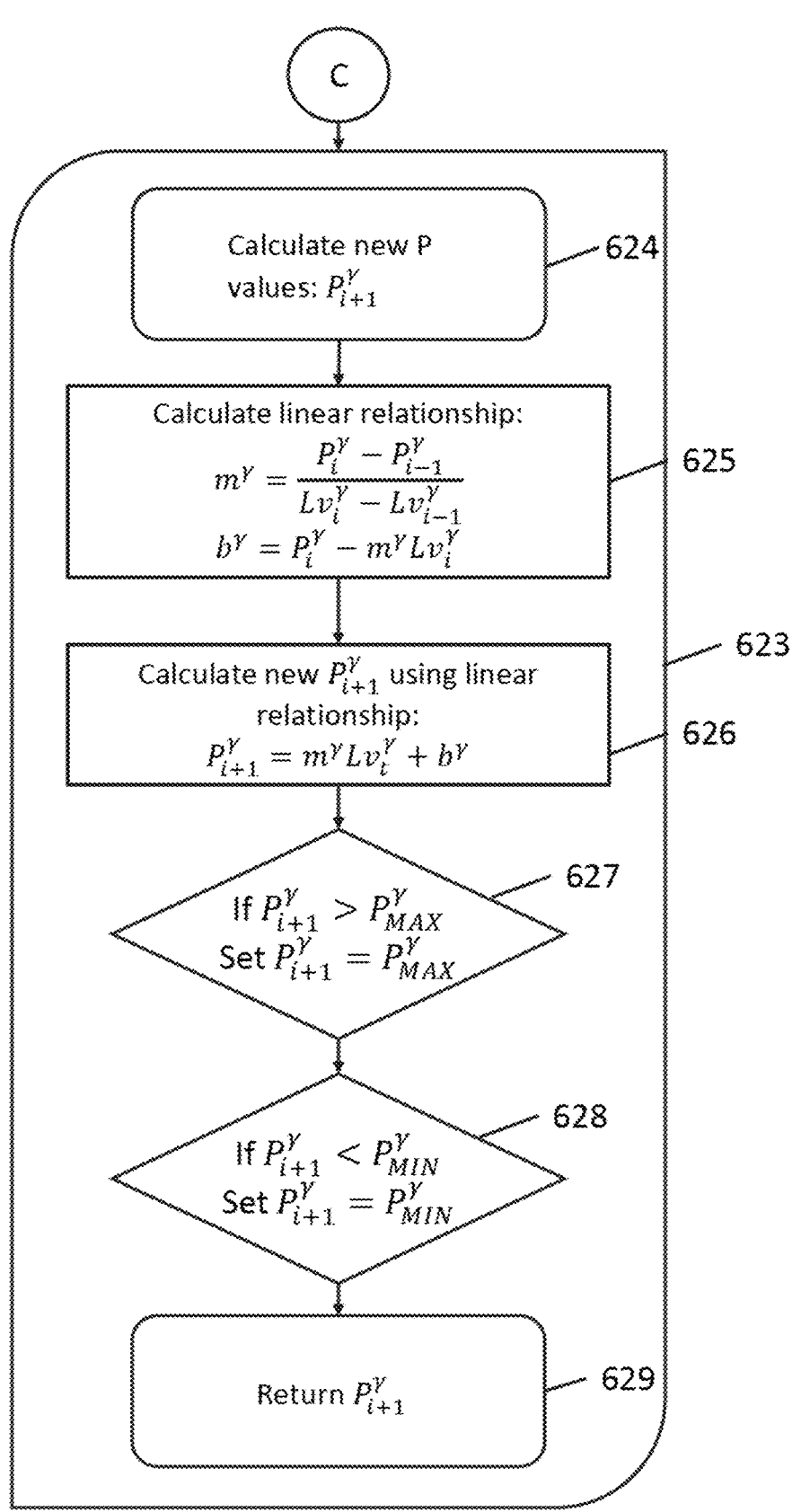

FIG. 6D sets out linear approximation process 623 via connection point C. Process 623 takes the following parameters as an input at step 624:

$$P_i^\gamma, P_{i-1}^\gamma, Lv_i^\gamma, Lv_{i-1}^\gamma;$$

and outputs $$P_{i+1}^\gamma$$

at step 629. In other words, process 623 calculates the next control parameters to apply to the light sources based on the respective colour luminance value $$Lv_i^\gamma,$$

a previous colour luminance value from a previous iteration $$Lv_{i-1}^\gamma$$

or an initial colour luminance value $$Lv_0^\gamma,$$

the respective first value of the first control parameter $$P_i^\gamma,$$

and a previous value of the first control parameter from a previous iteration $$P_{i-1}^\gamma$$

or an initial value of the first control parameter $$P_0^\gamma.$$

In step 625, a linear relationship is calculated between the control parameter and each colour luminance value. In embodiments with three light sources, this step results in three linear relationships: one for each colour. Each linear relationship is calculated by determining a gradient (or rate of change) for the present iteration and the previous iteration. In other words, the gradient of a line intersecting the two points $$(Lv_i^\gamma, P_i^\gamma) \text{ and } (Lv_{i-1}^\gamma, P_{i-1}^\gamma)$$

is calculated according to the following equation:

$$m^\gamma = \frac{P_i^\gamma - P_{i-1}^\gamma}{Lv_i^\gamma - Lv_{i-1}^\gamma}$$

An offset for each linear equation is also calculated once the gradient is known according to the following equation:

$$b^\gamma = P_i^\gamma - m^\gamma Lv_i^\gamma$$

Once the gradient and offset has been calculated, in step 626 the new control parameter values are calculated by applying the respective target colour luminance values to the linear relationships:

$$P_{i+1}^\gamma = m^\gamma Lv_i^\gamma + b^\gamma$$

In step 627, a check is made as to whether the new control parameter value exceeds a maximum allowable value $$P_{MAX}^\gamma$$

(dictated, for example, by safety or operational limits) which may be saved in the memory of the computing device 416. If the new control parameter value exceeds the maximum allowed value, then the new control parameter value is set to the maximum value.

Similarly, in step 628 a check is made as to whether the new control parameter value falls below a minimum allowable value $$P_{MIN}^\gamma$$

which may also be saved in the memory of the computing device 416. If the new control parameter value falls below the minimum allowable value, then the new control parameter value is set to the minimum value. The new control parameter values are then returned as an output at step 629.

Returning to FIG. 6C and following on from the completion of step 616, in step 617 the new control parameter values are applied to the plurality of light sources.

In step 618, a measurement is made of the luminance and colour space coordinates of the light pattern with the new control parameter values applied to the light sources. In step 619, the error from the target values is then calculated with the new control parameter values applied to the light sources.

In step 620, a check is made as to whether the value of i exceeds a maximum predetermined maximum number of iterations Max_i which may be a value saved in the memory of the computing device 416. If the maximum number of iterations has not been exceeded (YES), then the process returns to step 614, and the iterative loop continues. If the maximum number of iterations has been reached (NO), then the process goes on to step 621. The number of iterations may be limited in this way to avoid situations where the process becomes stuck in a loop without reducing the error from the target values. The loop may also be ended by the NO option of step 614, i.e. when the error is acceptably low and below the predetermined thresholds.

That is, steps 615-620 are repeated while any of the error values are above the respective thresholds and while the number of iterations is below the maximum number of iterations. Each time this loop repeats, the value of i is incremented by 1.

In step 621, the last-calculated control parameter values are saved to the memory of the computing device 416. For example, the last-calculated control parameter values may be saved in a lookup table alongside an ambient temperature of the projector system.

The white balance calibration algorithm then ends at step 622.

Figure 7:
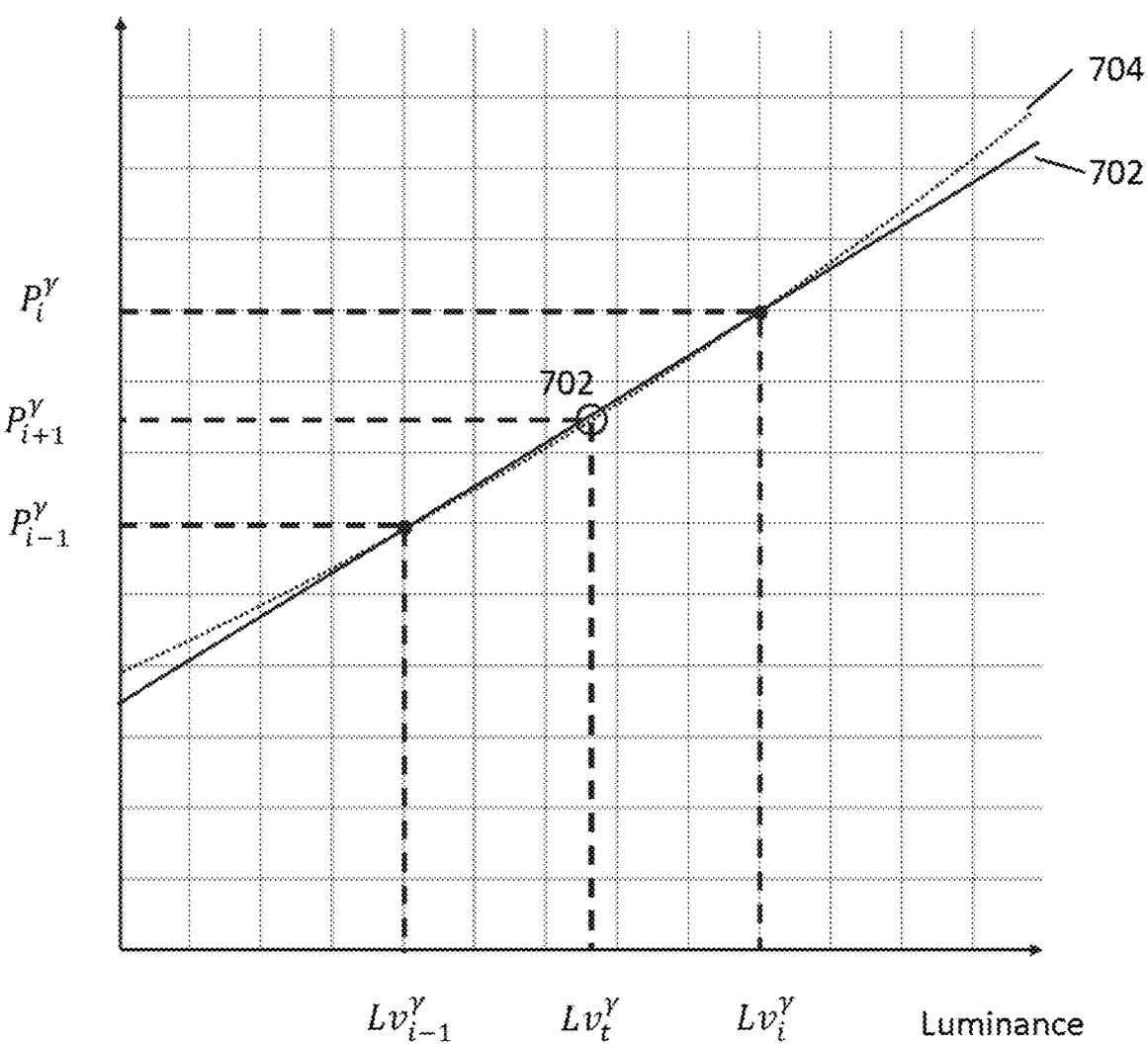
FIG. 7 shows an example linear relationship between a control parameter and colour luminance values and an estimate of a control parameter value for a next iteration of a white balance calibration method.

FIG. 7 provides an illustration of the application of the calculated linear relationship 702 to obtain the new control parameter. In the illustrated example, the current iteration data point $$(Lv_i^\gamma, P_i^\gamma)$$

has overshot the target luminance compared to the previous iteration data point $$(Lv_{i-1}^\gamma, P_{i-1}^\gamma)$$

such that the new control parameter value is estimated to be between these two points along the calculated linear relationship line. FIG. 7 also illustrates how an actual response curve 704 of a light source may not have a perfectly linear shape. However, the inventors have found that a linear approximation of this relationship, when paired with the iterative approach described in relation to FIGS. 6A, 6B, 6C, and 6D, is able to converge on the target luminance in very few iterations without the need to compute higher order approximations.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

As described herein a composite colour holographic reconstruction comprising first, second and third single colour holographic reconstructions is formed. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method comprising:
(i) applying a respective value of a first plurality of values of a first control parameter to each light source of a plurality of light sources of a projector system, each light source of the plurality of light sources configured to output a different wavelength of light, wherein applying each of the first plurality of values of the first control parameter causes each light source of the plurality of light sources to output light having a respective first output luminance;
(ii) measuring a first luminance and first colour space coordinates of a light pattern displayed by the projector system, wherein the light pattern is generated by applying the first plurality of values of the first control parameter to the plurality of light sources;
(iii) converting the first luminance and first colour space coordinates to corresponding tristimulus values;
(iv) calculating, based on the corresponding tristimulus values, a respective colour luminance value corresponding to each light source of the plurality of light sources,
wherein the calculation comprises solving a plurality of linear equations, each linear equation of the plurality of linear equations being derived from a sum of the contributions of the plurality of light sources to a respective tristimulus value, to obtain each colour luminance value;
(v) calculating a linear relationship between the first control parameter and each colour luminance value based on:
(a) the respective colour luminance value;
(b) either a previous colour luminance value from a previous iteration or an initial colour luminance value;
(c) the respective first value of the first control parameter; and
(d) either a previous value of the first control parameter from a previous iteration or an initial value of the first control parameter;
(vi) determining a second plurality of values of the first control parameter based on the linear relationships and a target colour luminance value for each light source; and
(vii) applying the second plurality of values of the first control parameter to the plurality of light sources, wherein applying each of the second plurality of values of the first control parameter causes each light source of the plurality of light sources to output light having a respective second output luminance.

2. The method of claim 1, wherein the plurality of light sources comprises a first light source configured to output a first wavelength of light having colour space coordinates $x^R$, $y^R$, $z^R=(1-x^R-y^R)$, a second light source configured to output a second wavelength of light having colour space coordinates $x^G$, $y^G$, $z^G=(1-x^G-y^G)$, and a third light source configured to output a third wavelength of light having colour space coordinates $x^B$, $y^B$, $z^B=(1-x^B-y^B)$.

3. The method of claim 2, wherein the first wavelength is in the range of 620 to 750 nm, the second wavelength is in the range of 490 to 570 nm, and the third wavelength is in the range of 450 to 495 nm, and wherein the first wavelength and the second wavelength are separated by at least 150 nm, and the second wavelength and the third wavelength are separated by at least 60 nm.

4. The method of claim 2, wherein the conversion of the first luminance and first colour space coordinates into respective tristimulus values, X, Y and Z, comprises the calculations:

$$X = Lv\frac{x}{y},$$

$$Y = Lv, \text{ and}$$

$$Z = Lv\frac{(1-x-y)}{y},$$

wherein Lv is the first luminance and (x, y) are the first colour space coordinates.

5. The method of claim 4, wherein the calculation of the respective colour luminance values comprises solving the three linear equations:

$$X = Lv^R\frac{x^R}{y^R} + Lv^G\frac{x^G}{y^G} + Lv^B\frac{x^B}{y^B},$$

$$Y = Lv^R + Lv^G + Lv^B, \text{ and}$$

$$Z = Lv^R\frac{z^R}{y^R} + Lv^G\frac{z^G}{y^G} + Lv^B\frac{z^B}{y^B},$$

wherein $x^\gamma$, $y^\gamma$, $z^\gamma = (1-x^\gamma-y^\gamma)$, are the colour space coordinates for the first wavelength, second wavelength, and third wavelength, such that $\gamma = \{R, G, B\}$, in order to obtain a first colour luminance value $Lv^R$ corresponding to the first light source, a second colour luminance value $Lv^G$ corresponding to the second light source, and a third colour luminance value $Lv^B$ corresponding to the second light source.

6. The method of claim 5, wherein the linear relationship between the first control parameter and the respective colour luminance value is determined based on the calculation:

$$m^\gamma = \frac{P_i^\gamma - P_{i-1}^\gamma}{Lv_i^\gamma - Lv_{i-1}^\gamma},$$

$$b^\gamma = P_i^\gamma - m^\gamma Lv_i^\gamma,$$

wherein $$P_i^\gamma$$

is the respective value of the first control parameter of the first plurality of values corresponding to each respective light source, $$P_{i-1}^\gamma$$

is the previous value of the first control parameter from the previous iteration or the initial value of the first control parameter corresponding to each respective light source, $$Lv_i^\gamma$$

is the colour luminance value for each respective light source, $$Lv_{i-1}^\gamma$$

is the colour luminance value from the previous iteration or the initial colour luminance value, $m^\gamma$ is the gradient of the respective linear relationship, and $b^\gamma$ is the offset of the respective linear relationship.

7. The method of claim 6, wherein each of the second plurality of values of the first control parameter, $$P_{i+1}^\gamma,$$

is determined based on the calculation of:

$$P_{i+1}^\gamma = m^\gamma Lv_t^\gamma + b^\gamma,$$

wherein $$Lv_t^\gamma$$

is the target colour luminance value for each light source.

8. The method of claim 1, wherein steps (i) to (vii) form an initial iteration in which calculating the linear relationship between the first control parameter and each colour luminance value is based on:

(a) the respective colour luminance value;

(b) an initial colour luminance value;

(c) the respective first value of the first control parameter; and (d) an initial value of the first control parameter;

wherein the method steps (i) to (vii) are repeated for one or more further iterations in which calculating the linear relationship between the first control parameter and each colour luminance value is based on:

(a) the respective colour luminance value;

(b) a previous colour luminance value from a previous iteration;

(c) the respective first value of the first control parameter; and (d) a previous value of the first control parameter from a previous iteration.

9. The method of claim 8, wherein the one or more iterations are performed while a difference between the first luminance and a target luminance is below a first threshold and a difference between the first colour space coordinates and target colour space coordinates is below a second threshold.

10. The method of claim 8, wherein the method steps of claim 1 are repeated at a first temperature of the projector system.

11. The method of claim 10, wherein the first temperature and the second plurality of values of the first control parameter is saved in a lookup table implemented on a computing device in communication with the projector system when the difference between the first luminance and a target luminance is below a first threshold and a difference between the first colour space coordinates and target colour space coordinates is below a second threshold.

12. The method of claim 1, wherein the first control parameter comprises one of the group comprising: a pulse width modulation parameter for each of the plurality of light sources, a digital-analogue converter parameter for each of the plurality of light sources, a photodiode signal parameter for each of the plurality of light sources, and a scaling factor applied to a uniformity map for controlling the amount of light projected by each of the light sources.

13. The method of claim 12, wherein the selection from the group is determined based on the measured value of the first luminance.

14. The method of claim 13, wherein a first one of the group is selected for a first range of measured first luminance values, and a second one of the group is selected for a second range of measured first luminance values.

15. The method of claim 12, further comprising applying a first plurality of values of a second control parameter each corresponding to a respective one of the plurality of light sources, wherein the second control parameter is a different one of the group than the first control parameter, wherein the second control parameter is used to control an overall luminance of the projector system.

16. A projector system comprising:
a plurality of light sources, each configured to output a different wavelength of light;
a display device configured to display a hologram, such that a light pattern is displayed at an image plane when the display device is illuminated by the plurality of light sources;
a measurement device configured to measure a first luminance and first colour space coordinates of the light pattern displayed at the image plane; and
a computing device in communication with the plurality of light sources and the measurement device, wherein the computing device is configured to:
apply a respective value of a first plurality of values of a first control parameter to each of the plurality of light sources, wherein applying each value of the first plurality of values of the first control parameter causes each light source of the plurality of light sources to output light having a respective first output luminance;
receive the first luminance and first colour space coordinates from the measurement device;
convert the first luminance and first colour space coordinates to corresponding tristimulus values;
calculate, based on the corresponding tristimulus values, a respective colour luminance value corresponding to each light source of the plurality of light sources,
wherein the calculation comprises solving a plurality of linear equations, each linear equation of the plurality of linear equations being derived from a sum of the contributions of the plurality of light sources to a respective tristimulus value, to obtain each colour luminance value,
calculate a linear relationship between the first control parameter and each colour luminance value based on:

(a) the respective colour luminance value;
(b) either a previous colour luminance value from a previous iteration or an initial colour luminance value;
(c) the respective first value of the first control parameter; and
(d) either a previous value of the first control parameter from a previous iteration or an initial value of the first control parameter;
determine a second plurality of values of the first control parameter based on the linear relationships and a target luminance value for each light source; and
apply the second plurality of values of the first control parameter to the plurality of light sources, wherein applying each of the second plurality of values of the first control parameter causes each light source of the plurality of light sources to output light having a respective second output luminance.

17. A method of projection comprising:
applying a respective value of a first plurality of values of a first control parameter to each light source of a plurality of light sources of a projector system, each light source of the plurality of light sources configured to output a different wavelength of light, wherein applying each of the first plurality of values of the first control parameter causes each light source of the plurality of light sources to output light having a respective first output luminance;
projecting a first light pattern by applying the first plurality of values of the first control parameter to the plurality of light sources and illuminating a hologram corresponding to the light pattern with the plurality of light sources;
measuring a first luminance and first colour space coordinates of the light pattern;
converting the first luminance and first colour space coordinates to corresponding tristimulus values;
calculating, based on the corresponding tristimulus values, a respective colour luminance value corresponding to each light source of the plurality of light sources,
wherein the calculation comprises solving a plurality of linear equations, each linear equation of the plurality of linear equations being derived from a sum of the contributions of the plurality of light sources to a respective tristimulus value, to obtain each colour luminance value;
calculating a linear relationship between the first control parameter and each colour luminance value based on:
(a) the respective colour luminance value;
(b) either a previous colour luminance value from a previous iteration or an initial colour luminance value;
(c) the respective first value of the first control parameter; and
(d) either a previous value of the first control parameter from a previous iteration or an initial value of the first control parameter;
determining a second plurality of values of the first control parameter based on the linear relationships and a target colour luminance value for each light source; and
projecting a second light pattern by applying the second plurality of values of the first control parameter to the plurality of light sources, wherein applying each of the second plurality of values of the first control parameter causes each light source of the plurality of light sources to output light having a respective second output luminance.

18. A non-transitory computer readable medium comprising instructions which, when executed by one or more processors, cause the one or more processors to:

(i) apply a respective value of a first plurality of values of a first control parameter to each light source of a plurality of light sources of a projector system, each light source of the plurality of light sources configured to output a different wavelength of light, wherein each of the first plurality of values of the first control parameter determines an output luminance of a corresponding light source of the plurality of light sources;

(ii) measure a first luminance and first colour space coordinates of a light pattern displayed by the projector system, wherein the light pattern is generated by applying the first plurality of values of the first control parameter to the plurality of light sources;

(iii) convert the first luminance and first colour space coordinates to corresponding tristimulus values;

(iv) calculate, based on the corresponding tristimulus values, a respective colour luminance value corresponding to each light source of the plurality of light sources, wherein the calculation comprises solving a plurality of linear equations, each linear equation of the plurality of linear equations being derived from a sum of the contributions of the plurality of light sources to a respective tristimulus value, to obtain each colour luminance value;

(v) calculate a linear relationship between the first control parameter and each colour luminance value based on: the respective colour luminance value, a previous colour luminance value from a previous iteration or an initial colour luminance value, the respective first value of the first control parameter, and a previous value of the first control parameter from a previous iteration or an initial value of the first control parameter;

(vi) determine a second plurality of values of the first control parameter based on the linear relationships and a target colour luminance value for each light source; and (vii) control the plurality of light sources using the second plurality of values of the first control parameter.

* * * * *